US006729121B2

United States Patent
Sato et al.

(10) Patent No.: US 6,729,121 B2
(45) Date of Patent: May 4, 2004

(54) ADSORBENT DETERIORATION DETERMINING APPARATUS

(75) Inventors: Masahiro Sato, Saitama-ken (JP); Takashi Haga, Saitama-ken (JP); Norihito Watanabe, Saitama-ken (JP); Kenji Abe, Saitama-ken (JP); Tetsuo Endo, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,247

(22) Filed: Sep. 5, 2002

(65) Prior Publication Data

US 2003/0049176 A1 Mar. 13, 2003

(30) Foreign Application Priority Data

Sep. 7, 2001 (JP) .......................... 2001-272754

(51) Int. Cl.[7] ................................. F01N 3/00
(52) U.S. Cl. .............. 60/277; 60/297; 60/311
(58) Field of Search ................ 60/277, 297, 311, 60/276

(56) References Cited

U.S. PATENT DOCUMENTS 5,729,971 A * 3/1998 Matsuno et al. ............ 60/277

2001/0025484 A1 * 10/2001 Ueno et al. ............ 60/277

FOREIGN PATENT DOCUMENTS

JP 05-256124 * 10/1993

* cited by examiner

Primary Examiner—Thomas Denion
Assistant Examiner—Diem Tran
(74) Attorney, Agent, or Firm—Westerman, Hattori, Daniels & Adrian, LLP

(57) ABSTRACT

An adsorbent deterioration determining apparatus can accurately determine a deterioration of an adsorbent in a relatively simple configuration. The adsorbent deterioration determining apparatus determines a deterioration of an adsorbent arranged in an exhaust system of an internal combustion engine for purifying exhaust gases. The adsorbent is capable of adsorbing hydrocarbons and moisture in exhaust gases. The adsorbent deterioration determining apparatus comprises a humidity sensor arranged at a location downstream of the adsorbent in the exhaust system for detecting the humidity of exhaust gases, and an ECU for determining a deterioration of the adsorbent in accordance with a detected output of the humidity sensor at the time a predetermined time has elapsed from a start of the internal combustion engine.

4 Claims, 13 Drawing Sheets

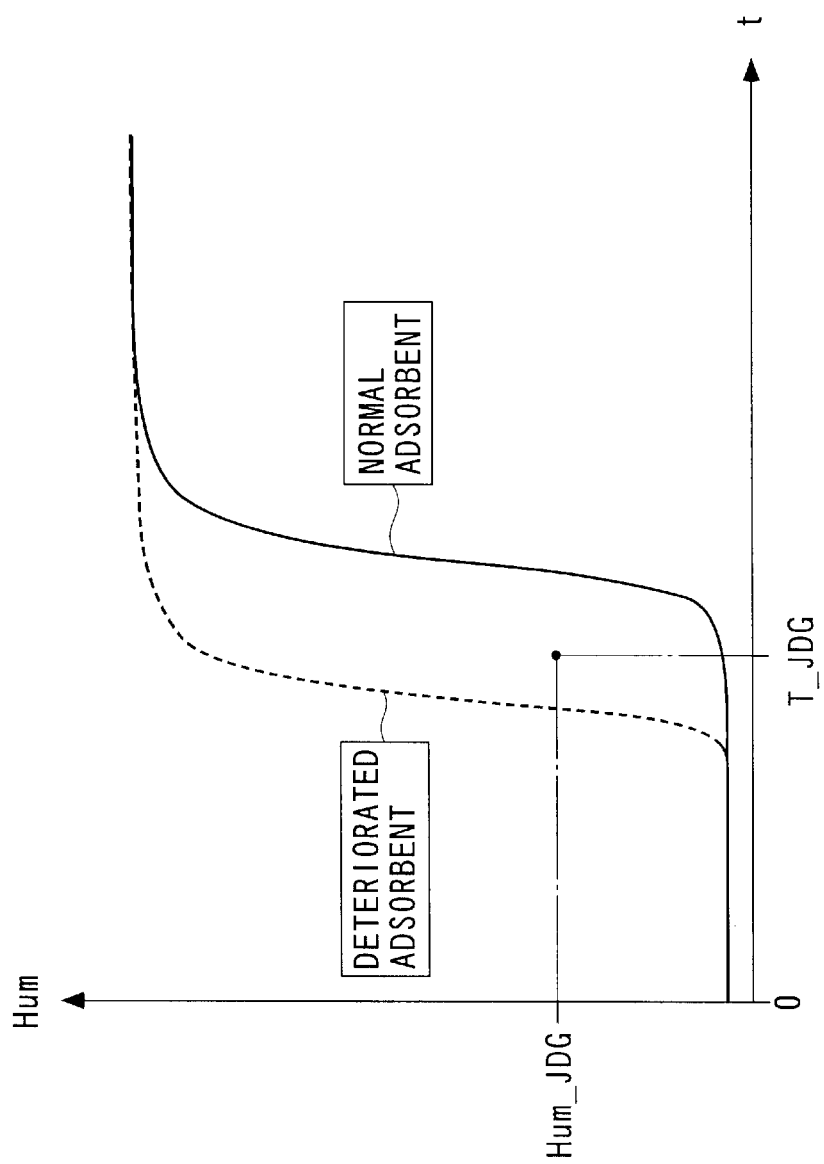

ADSORBENT DETERIORATION DETERMINING APPARATUS

BACKGROUND OF THE INVENTION

1. Field of the Invention

The present invention relates to an adsorbent deterioration determining apparatus for determining a deterioration of an adsorbent which is arranged in an exhaust system of an internal combustion engine for adsorbing hydrocarbons in exhaust gases to purify the exhaust gases.

2. Description of the Prior Art

A conventional adsorbent deterioration determining apparatus of the type mentioned above is known and disclosed, for example, in Laid-open Japanese Patent Application No. 11-2115. This conventional determining apparatus is provided with temperature sensors arranged at locations upstream and downstream of an adsorbent, respectively, for determining a deterioration of the adsorbent by comparing times at which both the temperature sensors generate peaks of detected values, or comparing times at which both the temperature sensors generate peaks of detected values differentiated by time, while the adsorbent is in adsorbing conditions. Such a determining approach relies on the nature of the adsorbent for determining the deterioration of the adsorbent. Specifically, in the adsorbing conditions, the adsorbent presents a peak of the internal temperature or its rising rate, and the peak occurs later at a downstream location than at an upstream location, and the peak occurs earlier at the downstream location as the adsorbent is deteriorated. In this manner, the adsorbent can be determined for deterioration based on a comparison of times at which both the temperature sensors detect the peak values at their respective locations, rather than a comparison of temperature values themselves detected by the temperature sensors, without using highly accurate temperature sensor.

However, the conventional determining apparatus mentioned above merely evaluates the state of the adsorbent indirectly based on a change in the internal temperature of the adsorbent associated with the adsorbing action of the adsorbent, using as determination parameters the times at which the peaks of the internal temperatures or its rising rate are detected by the temperature sensors. Since this conventional determining apparatus does not directly sense an adsorbing state of the adsorbent, the determining apparatus is susceptible to errors and is incapable of accurately determining a deterioration of the adsorbent. In addition, due to the requirement of two temperature sensors, which are relatively expensive, the determining apparatus suffers from a corresponding increase in the manufacturing cost.

OBJECT AND SUMMARY OF THE INVENTION

The present invention has been made to solve the problems as mentioned above, and it is an object of the invention to provide an adsorbent deterioration determining apparatus which is capable of accurately determining a deterioration of an adsorbent in a relatively simple configuration.

To achieve the above object, the present invention provides an adsorbent deterioration determining apparatus for determining a deterioration of an adsorbent arranged in an exhaust system of an internal combustion engine for purifying exhaust gas, where the adsorbent capable of adsorbing hydrocarbons and moisture in exhaust gases. The adsorbent deterioration determining apparatus is characterized by comprising a humidity sensor arranged at a location downstream of the adsorbent in the exhaust system for detecting a humidity of exhaust gases; and deterioration determining means for determining a deterioration of the adsorbent in accordance with a detected output of the humidity sensor at the time a predetermined time has elapsed from a start of the internal combustion engine.

According to this adsorbent deterioration determining apparatus, the humidity sensor is arranged at a location downstream of the adsorbent in the exhaust system for detecting the humidity of exhaust gases, such that a deterioration of the adsorbent is determined in accordance with a detected output of the humidity sensor at the time the predetermined time has elapsed from the start of the internal combustion engine. The adsorbent is capable of adsorbing moisture as well as hydrocarbons, and its abilities to adsorb hydrocarbons and moisture are in a close relationship with each other, so that the humidity of exhaust gases at a location downstream of the adsorbent, detected by the humidity sensor, well reflects the condition in which the adsorbent adsorbs hydrocarbons.

Also, the humidity of exhaust gases downstream of the adsorbent does not rise in an initial stage after the internal combustion engine is started because moisture included in exhaust gases is adsorbed by the adsorbent together with hydrocarbons. Subsequently, the humidity rises as the adsorbent is gradually saturated, allowing the moisture in exhaust gases to incrementally pass through the adsorbent. When the adsorbent is deteriorated, a degradation in its adsorbing abilities allows moisture in exhaust gases to pass through the adsorbent earlier, so that the humidity of exhaust gases downstream of the adsorbent rises at a timing earlier than when the adsorbent is not deteriorated. Therefore, a deterioration of the adsorbent can be determined in accordance with the detected output of the humidity sensor at the time the predetermined time has elapsed from the start of the internal combustion engine to provide an accurate deterioration determination, while well reflecting the condition in which the adsorbent adsorbs hydrocarbons. In addition, since only one humidity sensor, which is generally less expensive than a temperature sensor, need be arranged at a location downstream of the adsorbent, the resulting determining apparatus can be made in a relatively simple configuration at a low cost.

Preferably, in the foregoing adsorbent deterioration determining apparatus, the humidity sensor includes a sensor element which has an impedance characteristic that varies in accordance with the humidity, and outputs as the detected output a voltage in accordance with a change in the impedance characteristic when the sensor element is applied with a supply voltage.

According to this preferred embodiment of the adsorbent deterioration determining apparatus, the sensor element forming part of the humidity sensor presents the impedance characteristic that varies in accordance with the humidity. A change in the impedance characteristic is read as a voltage by applying the sensor element with the supply voltage, and outputted as the detected output of the humidity sensor. Thus, this output voltage can be used in the deterioration determination as a parameter indicative of the humidity of exhaust gases downstream of the adsorbent. The output voltage generated in this manner is sufficient in regard to the accuracy for detecting a change in the humidity of exhaust gases required for determining the deterioration of the adsorbent. Also, since the sensor element is only required to include an additional component for applying a voltage thereto, the humidity sensor can be implemented in a simple circuit configuration at a low cost.

Preferably, in the adsorbent deterioration determining apparatus, the humidity sensor includes a sensor element which has an impedance characteristic that varies in accordance with the humidity, and an oscillator for generating an oscillating wave at a frequency defined in accordance with the impedance characteristic of the sensor element, wherein the humidity sensor outputs as the detected output the oscillating wave from the oscillator.

According to this preferred embodiment of the adsorbent deterioration determining apparatus, the sensor element forming part of the humidity sensor presents the impedance characteristic that varies in accordance with the humidity, and the oscillator outputs the oscillating wave having a frequency characteristic in accordance with the impedance characteristic as the detected output of the humidity sensor. Thus, the frequency characteristic of the oscillating wave can be used in the deterioration determination as a parameter indicative of the humidity of exhaust gases downstream of the adsorbent. In addition, a period, for example, can be used as the frequency characteristic, in which case a deterioration can be more accurately determined for the adsorbent because of the detection accuracy which can be more readily ensured, as compared with an embodiment which involves an A/D conversion of the output voltage value or the like.

Preferably, the adsorbent deterioration determining apparatus further comprises temperature detecting means for detecting a temperature around the humidity sensor; and relative humidity calculating means for calculating a relative humidity of exhaust gases based on the detected output of the humidity sensor, and the temperature detected by the temperature detecting means, wherein the deterioration determining means determines a deterioration of the adsorbent in accordance with the calculated relative humidity.

According to this preferred embodiment of the adsorbent deterioration determining apparatus, the relative humidity compensated for the temperature can be appropriately calculated based on the detected output of the humidity sensor and the temperature detected by the temperature detecting means. In addition, a deterioration of the adsorbent can be accurately determined in accordance with the relative humidity thus calculated.

BRIEF DESCRIPTION OF THE DRAWINGS

FIG. 13 is a timing chart showing the relationship between a change in the relative humidity after the internal combustion engine is started, and the deterioration determination made by the deterioration determination routine in FIG. 11 for a normal adsorbent and a deteriorated adsorbent.

DETAILED DESCRIPTION OF THE EMBODIMENT

Figure 1:
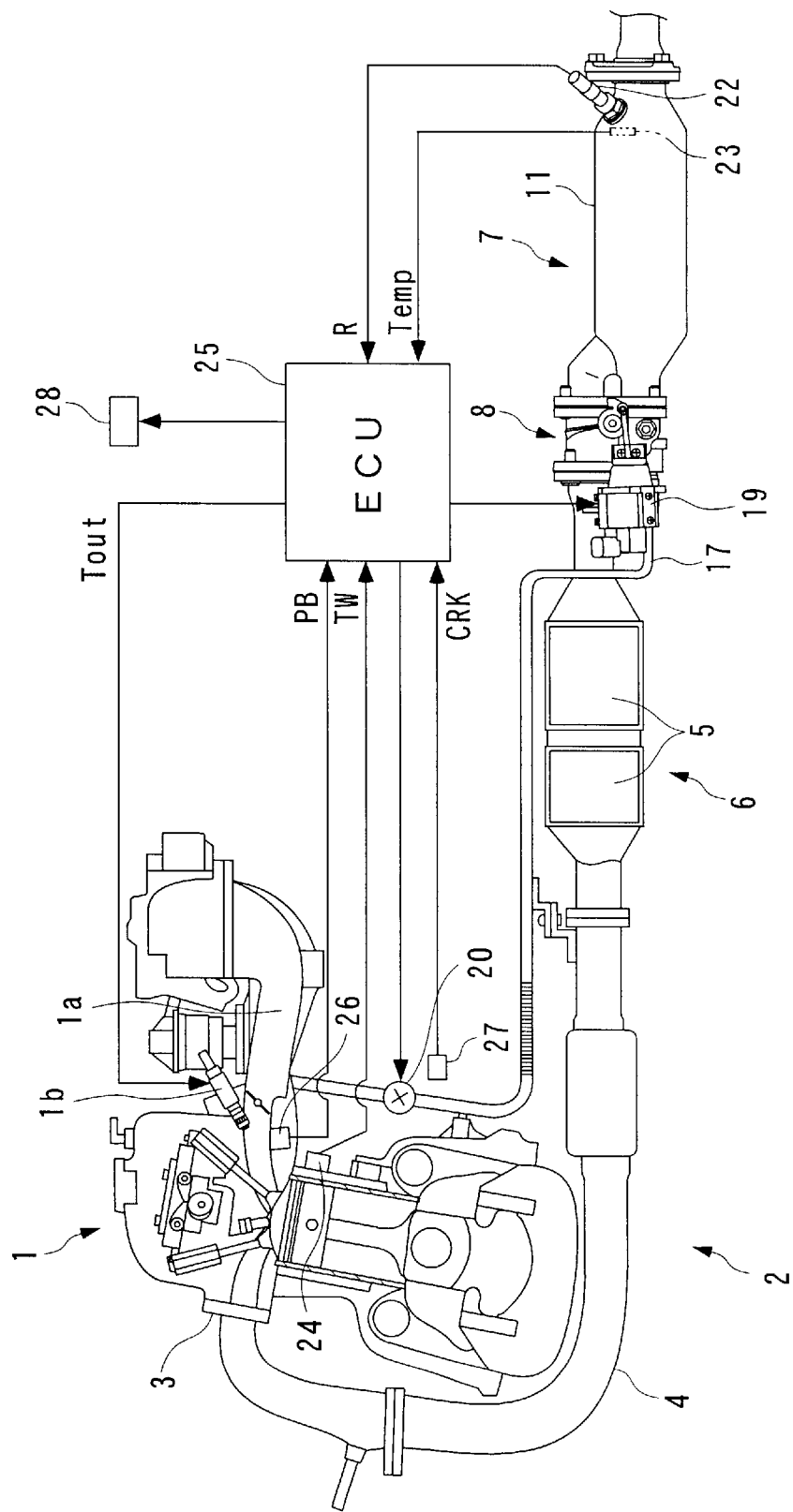
FIG. 1 is a diagram generally illustrating an internal combustion engine which is equipped with an adsorbent deterioration determining apparatus according to a first embodiment of the present invention.

In the following, a preferred embodiment of the present invention will be described in detail with reference to the accompanying drawings. FIG. 1 illustrates an internal combustion engine in which a first embodiment of the present invention is applied. The illustrated internal combustion engine (hereinafter referred to as the "engine") 1 includes an exhaust system 2 which has an exhaust pipe 4 connected to the engine 1 through an exhaust manifold 3. A catalyzer 6 having two three-way catalysts 5, and a hydrocarbon adsorber 7 for adsorbing hydrocarbons are provided halfway in the exhaust pipe 4 for purifying exhaust gases. The two three-way catalysts 5 of the catalyzer 6 are arranged adjacent to each other along the exhaust pipe 4, and purify harmful substances (hydrocarbons (HC), carbon monoxide (CO) and nitrogen oxides (NOx)) in exhaust gases passing through the catalyzer 6 by oxidation-reduction catalyst actions, when they are heated to a predetermined temperature (for example, 300° C.) or higher and activated.

Figure 2:
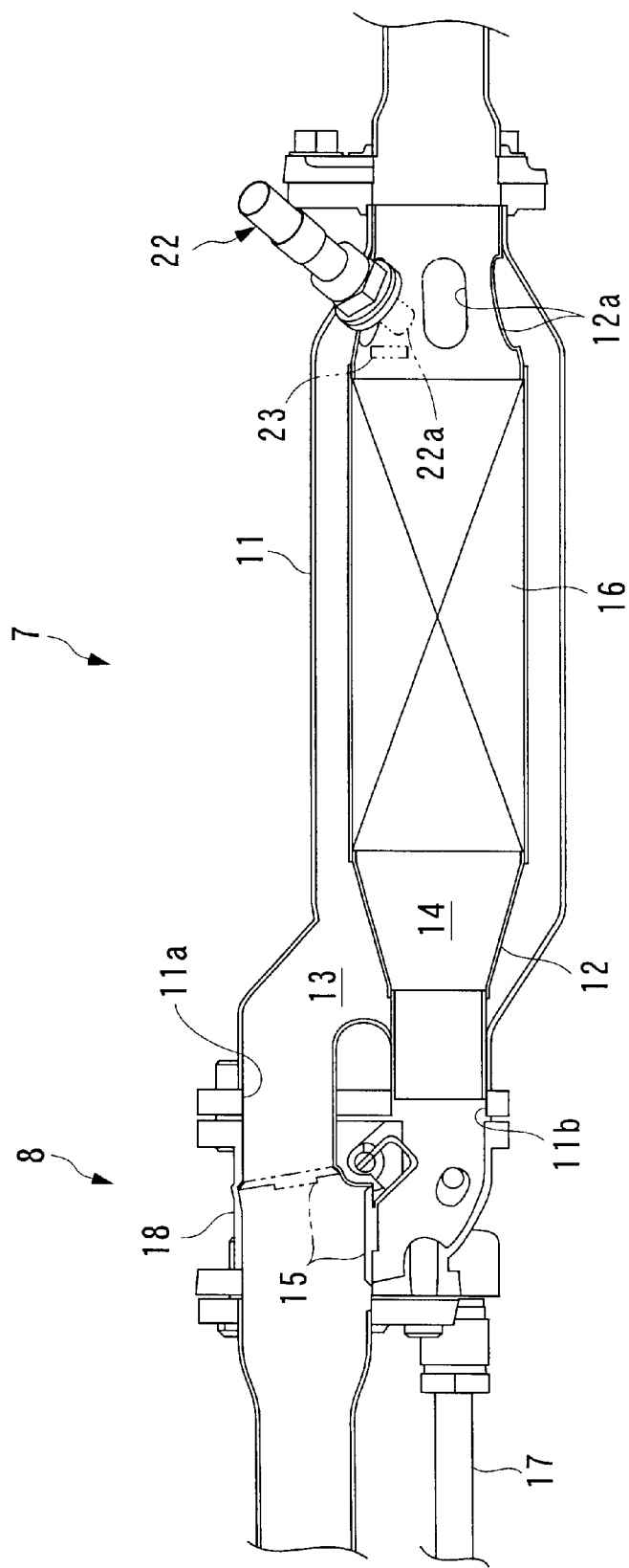
FIG. 2 is an enlarged cross-sectional view illustrating a hydrocarbon adsorber.

The hydrocarbon adsorber 7 in turn is arranged at a location downstream of the catalyst 6 in the exhaust pipe 4, and provided for reducing the amount of hydrocarbons emitted to the atmosphere by adsorbing hydrocarbons in exhaust gases during a starting period (for example, approximately 30–40 seconds from the start) of the engine 1 in a cold state in which the three-way catalysts 5 have not been activated. As illustrated in FIGS. 1 and 2, the hydrocarbon adsorber 7 is coupled to an downstream end of the catalyzer 6 through an exhaust passage switch 8. The hydrocarbon adsorber 7 comprises a substantially cylindrical case 11; a bypass exhaust pipe 12 arranged within the case 11; and a cylindrical adsorbent 16 arranged halfway in the bypass exhaust pipe 12 for adsorbing hydrocarbons in exhaust gases introduced into the bypass exhaust pipe 12.

As illustrated in FIG. 2, the case 11 has its upstream end divided into two upper and lower openings 11a, 11b. The upper opening 11a is in communication with a main passage 13 having an annular cross section and formed between the case 11 and bypass exhaust pipe 12, while the lower opening 11b is in communication with a bypass passage 14 which is an inner space of the bypass exhaust pipe 12.

The bypass exhaust pipe 12 has its upstream end connected to an inner surface of the lower opening 11b of the case 11, and a downstream end connected to an inner surface of a downstream end of the case 11, respectively, in an air tight state. The bypass exhaust pipe 12 is formed with a plurality (for example, five) of elongated communication holes 12a arranged in a downstream end portion in the circumferential direction at equal intervals, such that the downstream end of the main passage 13 is in communication with the downstream end of the bypass passage 14 through these communication holes 12a.

The adsorbent 16 is comprised of a honeycomb core (not shown), made of a metal, which carries zeolite on its surface, and has the property of adsorbing moisture as well as hydrocarbons. As exhaust gases introduced into the bypass passage 14 passes through the adsorbent 16, hydrocarbons and moisture in the exhaust gases are adsorbed by the zeolite. The zeolite, which has high heat resistant properties, adsorbs hydrocarbons at low temperatures (for example, below 100° C.), and desorbs hydrocarbons once adsorbed thereby at a predetermined temperature or higher (for example, 100–250° C.).

The exhaust passage switch 8 is provided for selectively switch the passage of exhaust gasses downstream of the catalyzer 6 to the main passage 13 or bypass passage 14 in accordance with whether the three-way catalysts 5 is activated. The exhaust pipe switch 8 comprises a substantially cylindrical coupling pipe 18; and a pivotable switching valve 15 arranged in the coupling pipe 18. The switching valve 15 is driven by a switching valve driver 19 (see FIG. 1) which is controlled by an ECU 25, later described, for switching the exhaust gas passage to the main passage 13 when it is present at a position indicated by solid lines in FIG. 2 and for switching the exhaust gas passage to the bypass passage 14 when it is present at a position indicated by two-dot chain lines.

An EGR pipe 17 is coupled between the coupling pipe 18 and the intake pipe 1a of the engine 1 for recirculating a portion of exhaust gases to the engine 1, and an EGR control valve 20 is arranged halfway in the EGR pipe 17. The EGR control valve 20 is controlled by the ECU 25 to actuate and stop the EGR and control an EGR amount.

In the foregoing configuration, the exhaust gas passage is switched to the bypass passage 14 by the exhaust passage switch 8 immediately after a cold start of the engine 1, thereby leading exhaust gasses passing through the catalyzer 6 to the bypass passage 14 and emitted to the atmosphere after hydrocarbons in the exhaust gases have been adsorbed by the adsorbent 16. Subsequently, as it is determined that hydrocarbons have been adsorbed by adsorbent 16, the exhaust gas passage is switched to the main passage 13 to lead the exhaust gases to the main passage 13 through the coupling pipe 18 for emission to the atmosphere. Also, as the EGR control valve 20 is opened to operate the EGR, a portion of the exhaust gases is recirculated to the intake pipe 1a through the bypass passage 14 and EGR pipe 17 as an EGR gas. Hydrocarbons desorbed from the adsorbent 16 are sent to the intake pipe 1a by the EGR gas and burnt by the engine 1.

A humidity sensor 22 is attached to the case 11 of the hydrocarbon adsorber 7 at a location downstream of the adsorbent 16. The humidity sensor 22 has a sensor element 22a (see FIG. 2) comprising a porous body, for example, made of alumina, titania or the like. Taking advantage of the characteristic that its resistance value R varies in accordance with the amount of moisture adsorbed into pores of the sensor element 22a, the humidity sensor 22 detects the humidity. The humidity sensor 22 outputs a detection signal indicative of the resistance value R of the sensor element 22a to the ECU 25.

Also, a temperature sensor 23 (temperature detecting means) comprising a thermistor or the like is provided near the sensor element 22a for detecting an ambient temperature Temp around the sensor element 22a of the humidity sensor 22 to send a detection signal indicative of the ambient temperature THCM to the ECU 25.

The ECU 25 also receives a signal indicative of an engine water temperature TW from an engine water temperature sensor 24; a signal indicative of an intake pipe inner pressure PB from an intake pipe inner pressure sensor 26; and a CRK signal, which is a pulse signal, from a crank angle sensor 27, respectively. The CRK signal is generated every predetermined crank angle associated with the rotation of a crank shaft, not shown, of the engine 1, so that the ECU 25 calculates a rotational speed NE of the engine 1 based on the CRK signal. An alarm lamp 28 is further connected to the ECU 25 for generating an alarm by lighting when it is determined that the adsorbent 16 is deteriorated.

The ECU 25 (deterioration determining means and relative humidity calculating means) is based on a microcomputer which comprises an I/O interfaced, a CPU, a RAM, a ROM and the like. The detection signals from the aforementioned sensors such as the humidity sensor 22 are inputted to the CPU after they are A/D converted and reshaped respectively in an I/O interface. The CPU controls a fuel injection time Tout of an injector 1b of the engine 1, the switching valve driver 19, and the EGR control valve 20, as well as determines a deterioration of the adsorbent 16 in the following manner in response to these detection signals in accordance with a control program stored in the ROM.

Figure 3:
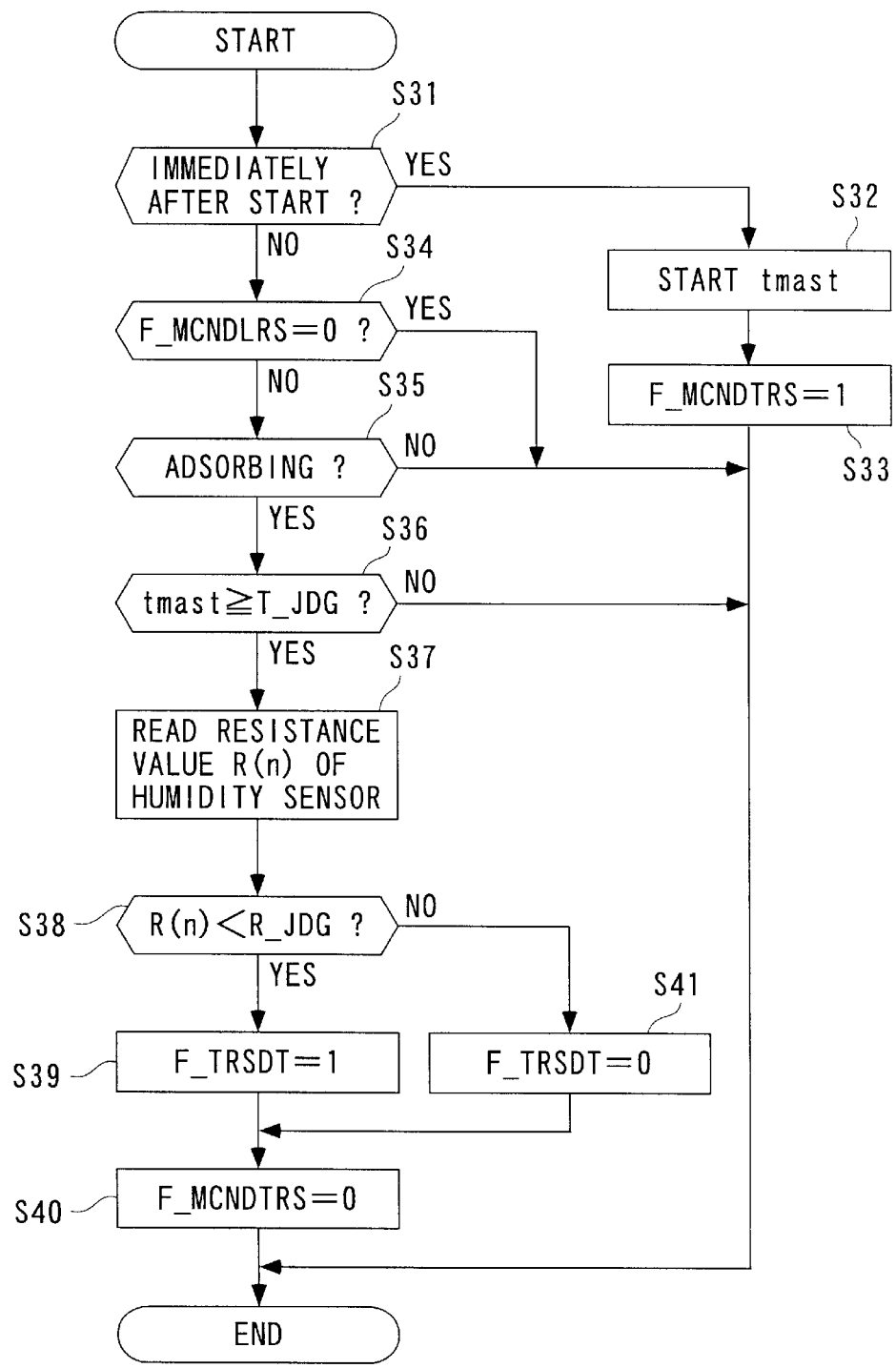
FIG. 3 is a flow chart illustrating a routine for determining a deterioration of an adsorbent.

FIG. 3 illustrates a routine for determining a deterioration of the adsorbent 16. First, in this routine, it is determined at step 31 (labeled as "S31" in the figure. The same applies to the following description) whether or not the engine 1 has just been started. If the engine 1 has just been started, the CPU starts a post-start timer tmast which incrementally counts a time from the start of the engine (step 32), and sets a deterioration determination completion flag F_MCNDTRS to "1" (step 33), followed by termination of the routine.

On the other hand, if the answer at step 31 is NO, indicating that the engine 1 has not just been started, it is determined that whether or not the deterioration determination completion flag F_MCNDTRS is "0" (step 34). If the answer to step 34 is YES, i.e., when the deterioration determination has been completed, the routine is terminated without further processing.

If the answer to step 34 is YES, i.e., when the deterioration determination has not been completed, it is determined whether or not the adsorbent 16 is operative in the adsorbing action (step 35). This determination is made, for example, based on whether or not the switching valve 15 is driven to the bypass passage 14, i.e., to the adsorbent 16. If the answer to step 34 is NO, indicating that the adsorbent 16 is not operative, the routine is terminated without further processing.

On the other hand, if the answer to step 35 is YES, it is determined whether or not a time measured by the post-start timer tmast is equal to or larger than a predetermined time T_JDG (for example, nine seconds) set therefor (step 36). If the answer to step 36 is NO, the routine is terminated without further processing. On the other hand, if the answer to step 36 is YES, i.e., when the predetermined time T_JDG has elapsed from the start of the engine 1, the CPU reads a resistance value R(n) of the humidity sensor 22 detected at this time (step 37) and determines whether or not the resistance value R(n) is smaller than a predetermined deterioration determining value R_JGD (for example, 1 MΩ) (step 38).

If the answer to step 38 is YES, i.e., when the resistance value R(n) of the humidity sensor 22 detected at the time the predetermined time T_JDG has elapsed from the start of the engine 1 is smaller than the deterioration determining value R_JGD, the CPU determines that the adsorbent 16 is deteriorated from the fact that the resistance value R lowers fast, i.e., that the humidity in exhaust gases rises fast at a location downstream of the adsorbent 16, and sets a deterioration flag F_TRSDT to "1" for indicating that the adsorbent 16 is deteriorated (step 39). Next, the CPU sets the deterioration determination completion flag F_MCNDTRS to "0" for indicating that the deterioration determination has been completed (step 40), followed by termination of the routine.

On the other hand, if the answer at step 38 is NO, i.e., when the resistance value R(n) is equal to or larger than the deterioration determining value R_JGD, the CPU determines that the adsorbent 16 is not deteriorated, and sets the deterioration flag F_TRSDT to "0" (step 41), followed by termination of the routine through the aforementioned step 40. It should be noted that after step 40 is executed, the answer at step 34 is YES, causing the routine to terminate without further processing. Stated another way, the deterioration determination for the adsorbent 16 is performed only once while the engine 1 is in operation after the start.

Figure 4:
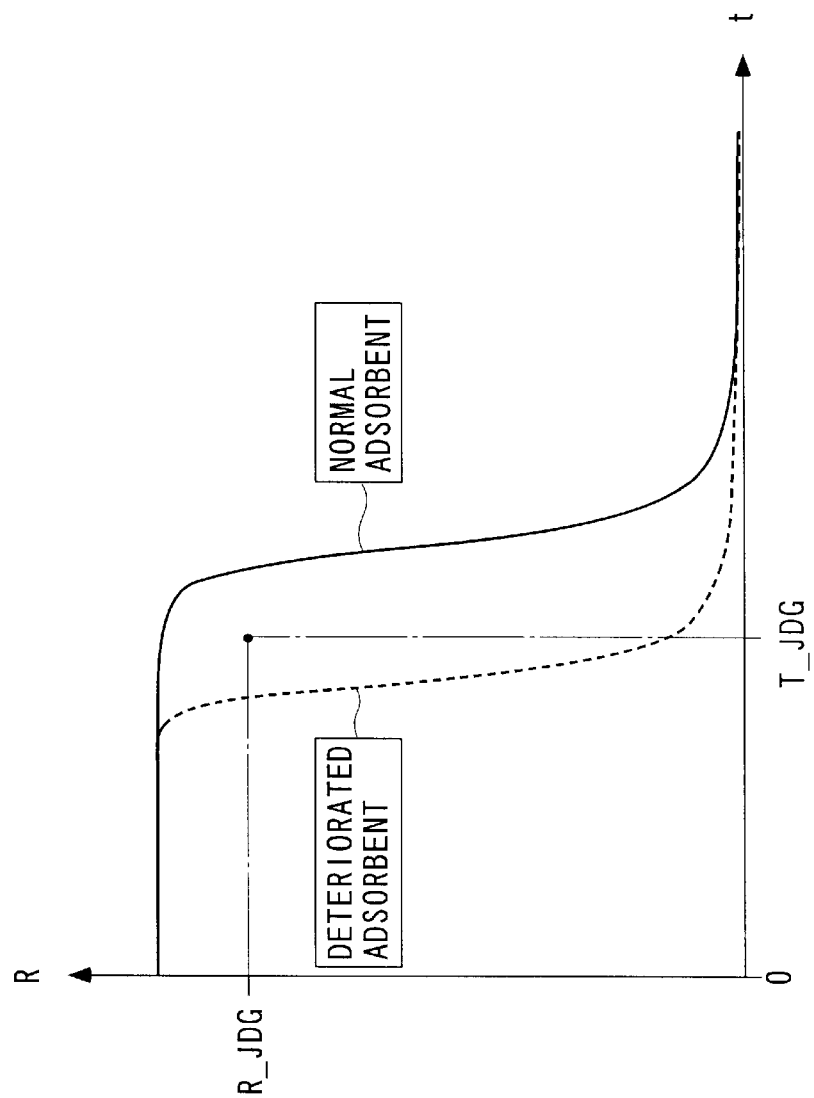
FIG. 4 is a timing chart showing the relationship between a change in the resistance value of a humidity sensor after an internal combustion engine is started, and the deterioration determination made by the deterioration determination routine in FIG. 3 for a normal adsorbent and a deteriorated adsorbent.

FIG. 4 shows exemplary changes in the resistance value R of the humidity sensor 22 from the start of the engine 1 when the adsorbent 16 is normal, i.e., not deteriorated (indicated by a solid line) and when the adsorbent 16 is deteriorated (indicated by a broken line) for facilitating the understanding of the deterioration determination made through the foregoing routine. As shown in FIG. 4, in an initial stage after the engine 1 has been started, moisture in exhaust gases is adsorbed by the adsorbent 16, so that the humidity in exhaust gases downstream of the adsorbent 16 is maintained at a low value identical to that before the start, and accordingly the resistance value R of the humidity sensor 22 is maintained at a high value which is substantially constant. Subsequently, as the moisture increasingly adsorbed by the adsorbent 16 brings the adsorbent 16 toward saturation, more moisture in exhaust gases passes through the adsorbent 16, causing an increase in the humidity in the exhaust gases downstream of the adsorbent 16 and a corresponding reduction in the resistance value R of the humidity sensor 22. Consequently, as the adsorbent 16 is saturated, the humidity in the exhaust gases downstream of the adsorbent 16 converges to a high value which is substantially constant, causing the resistance value R of the humidity sensor 22 to likewise converge to a low value which is substantially constant.

In comparison of a normal adsorbent with a deteriorated adsorbent, moisture in exhaust gases passes through the deteriorated adsorbent 16 faster due to a degraded adsorbing capability of the deteriorated adsorbent 16, so that the resistance value R of the humidity sensor 22 begins to lower at an earlier timing. As shown in FIG. 4, the predetermined time T_JDG and the deterioration determining value R_JDG used in the deterioration determination are set at intermediate values between portions of the two curves for the normal and deteriorated adsorbents in which the resistance value R becomes lower. Therefore, it is possible to accurately determine whether the adsorbent 16 is normal or deteriorated by comparing the resistance value R which is detected when the predetermined time T_JDG has elapsed from the start of the engine 1 with the deterioration determining value R_JDG.

Figure 5:
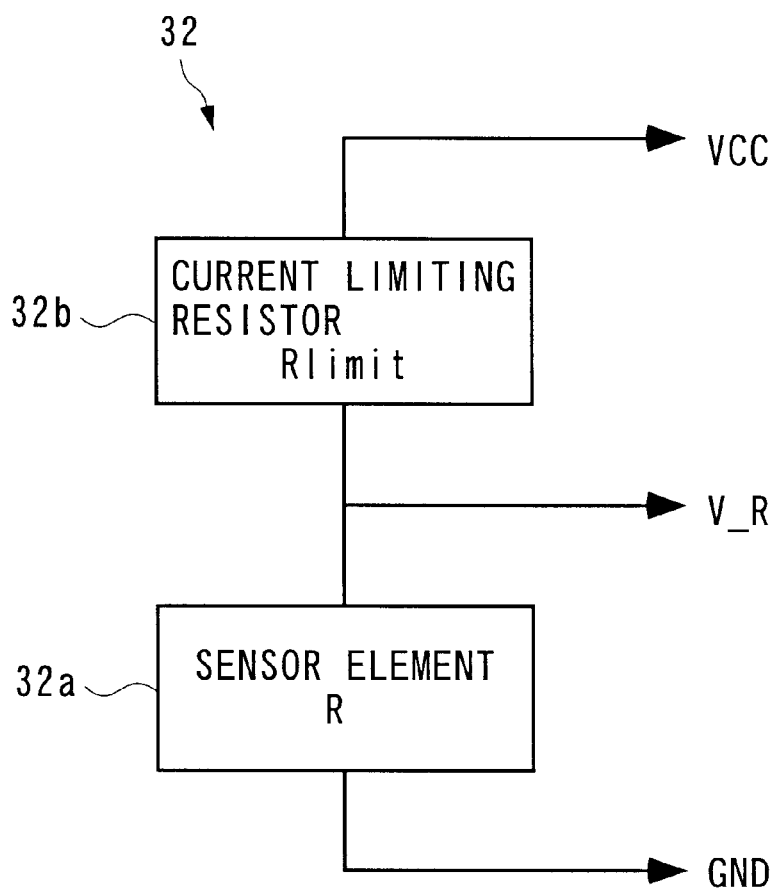
FIG. 5 is a block diagram illustrating the configuration of a humidity sensor used in a second embodiment of the present invention.
Figure 6:
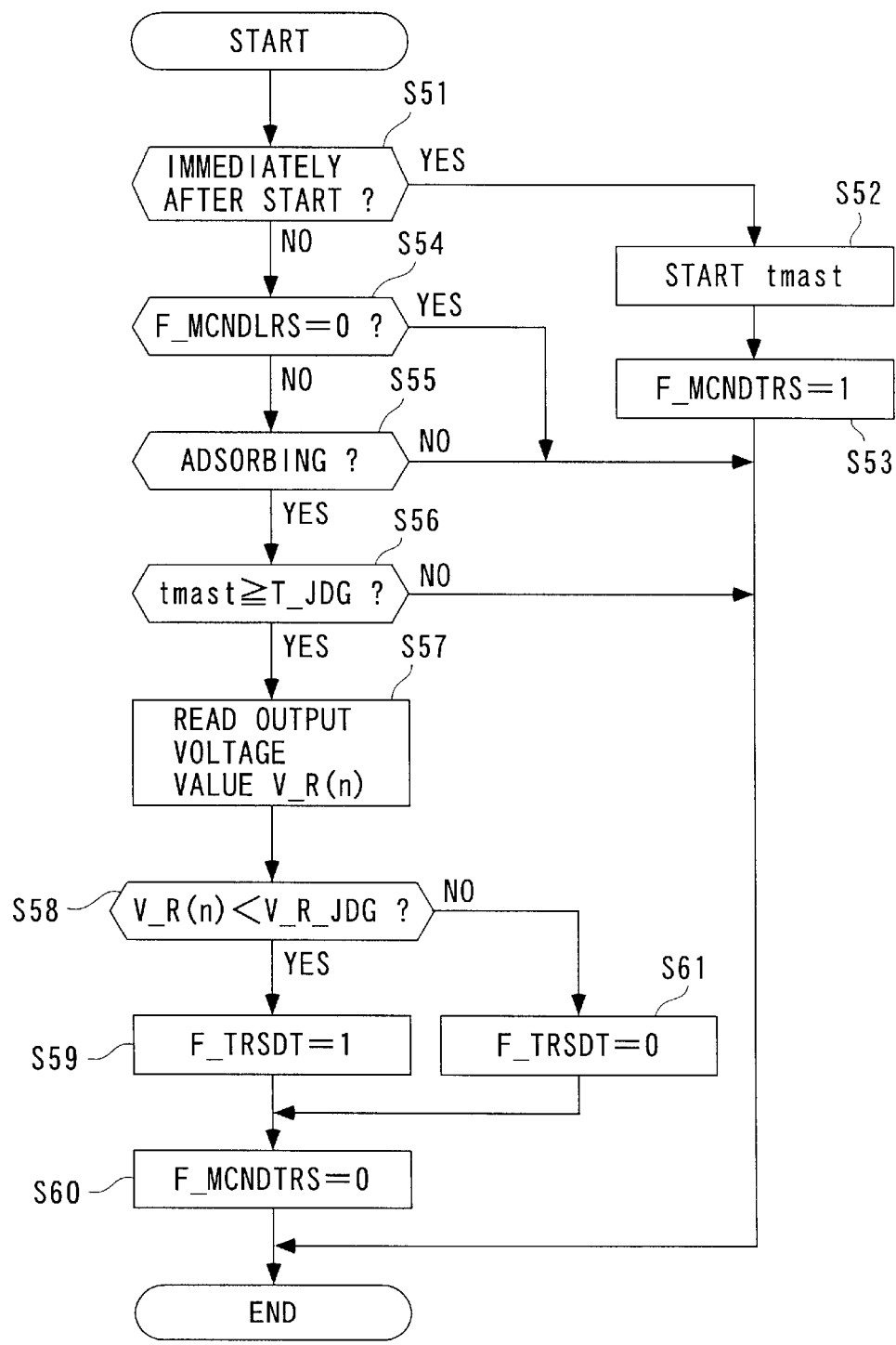
FIG. 6 is a flow chart illustrating a routine for determining a deterioration of the adsorbent according to the second embodiment.
Figure 7:
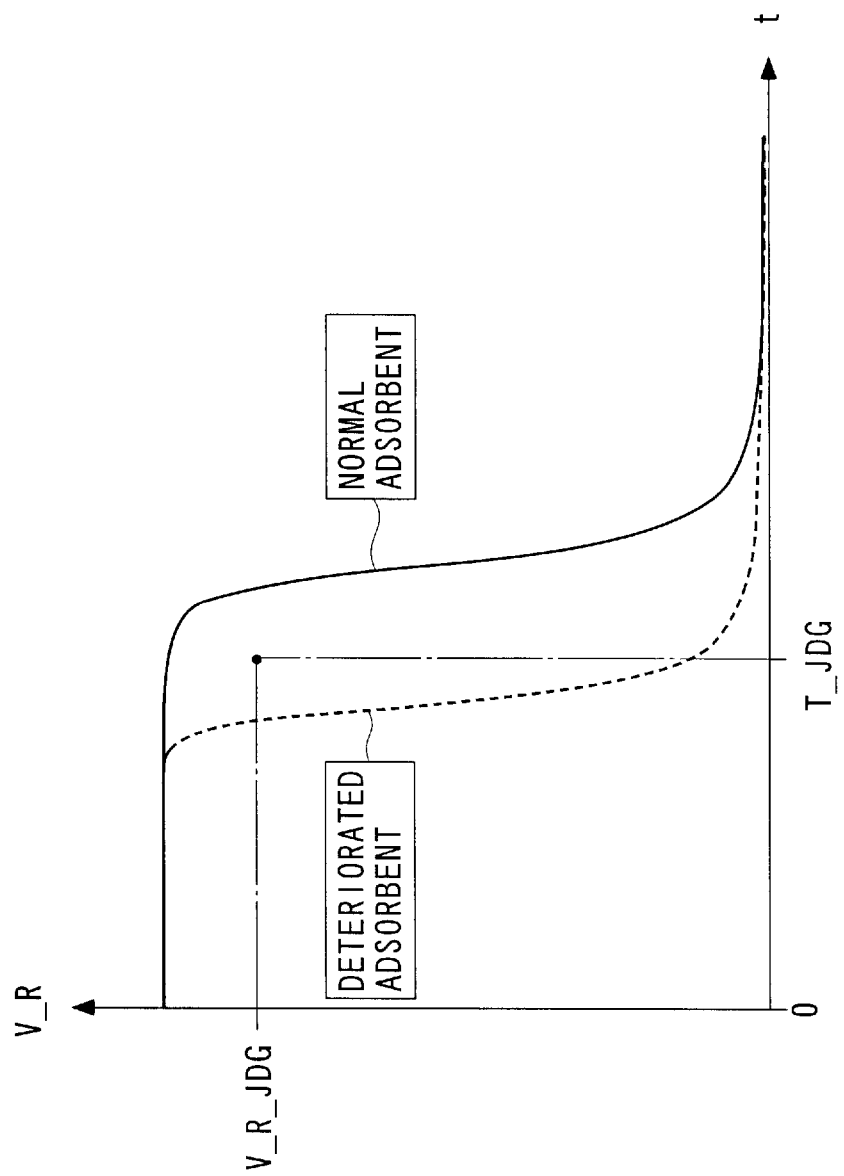
FIG. 7 is a timing chart showing the relationship between a change in an output voltage value of the humidity sensor after the internal combustion engine is started, and the deterioration determination made by the deterioration determination routine in FIG. 6 for a normal adsorbent and a deteriorated adsorbent.

FIGS. 5 through 7 illustrate a second embodiment of the present invention. FIG. 5 illustrates the circuit configuration of a humidity sensor 32 for use in the second embodiment. The humidity sensor 32 comprises a sensor element 32a, and a resistor 32b connected in series to the sensor element 32a and having a resistance value Rlimit (for example, 1 MΩ) for limiting a current (hereinafter referred to as the "current limiting resistor"). The sensor element 32a, which is similar in structure to the sensor element 22a of the humidity sensor 22 in the first embodiment, is of a type which presents a varying resistance value R (impedance characteristic) in accordance with the amount of adsorbed moisture. Also, a voltage VCC (for example, AC 1V) is applied between both ends of the sensor element 32a and the current limiting resistor 32b to output a partial voltage (hereinafter referred to as the "output voltage") V_R generated by the resistance value R of the sensor element 32a, which varies in accordance with the humidity of exhaust gases, to the ECU 25 as a detected output of the humidity sensor 32. Therefore, the output voltage V_R presents the same increasing/decreasing tendency as the resistance value R of the sensor element 32a, and more specifically presents a higher value as the humidity of exhaust gases is lower.

FIG. 6 illustrates a routine for determining a deterioration of the adsorbent 16 based on the output voltage V_R. Specific processing in this routine is basically identical to the routine for determining a deterioration of the adsorbent 16 in FIG. 3 based on the resistance value R. First, at steps 51–56, completely the same processing is executed as that at steps 31–36 in FIG. 3. If the answer to step 56 is YES, i.e., when the predetermined time T_JDG has elapsed after the start of the engine 1, the CPU reads the output voltage value V_R(n) of the humidity sensor 32 detected at this time (step 57), and the routine proceeds to step 58, where it is determined whether or not the read output voltage value V_R(n) is smaller than a predetermined deterioration determining value V_R_JGD (for example, 4 V) set therefor (see FIG. 7).

Then, similar to steps 39–41 in the routine of FIG. 3, if the answer to step 58 is YES, i.e., when the output voltage value V_R(n) is smaller than the deterioration determining value V_R_JGD at the time the predetermined time T_JDG has elapsed after the start of the engine 1, the CPU determines that the adsorbent 16 is deteriorated due to the fact that the humidity of exhaust gases rises at a high rate downstream of the adsorbent 16, and CPU sets the deterioration flag F_TRSDT to "1" (step 59). On the other hand, if V_R(n) is equal to or larger than V_R_JGD (V_R(n)≧V_R_JGD), the CPU determines that the adsorbent 16 is not deteriorated and sets the deterioration flag F_TRSDT to "0" (step 61), and then sets the deterioration determination completion flag F_MCNDTRS to "0" (step 60), followed by termination of the routine.

As described above, in the second embodiment, the output voltage V_R of the sensor element 32a in accordance with the varying resistance value R (impedance characteristic) when the voltage VCC is applied to the sensor element 32a is used as a detected output of the humidity sensor 32, and the output voltage value V_R detected when the predetermined time T_JDG has elapsed from the start of the engine 1 is compared with the deterioration determining value V_R_JDG, thereby making it possible to accurately determine whether the adsorbent 16 is normal or deteriorated in a manner similar to the first embodiment. Also, the output voltage V_R is sufficient in regard to the accuracy for detecting a change in the humidity of exhaust gases required for determining the deterioration of the adsorbent 16, and can be generated only by adding a component for applying the voltage VCC to the sensor element 32a, so that the humidity sensor 32 can be implemented in a simple circuit configuration at a low cost.

Since the sensor element 32a forming part of the humidity sensor 32 in the second embodiment is only required to exhibit an impedance characteristic which varies in accordance with the humidity, the resistance variable element may be replaced by a sensor element which varies the electrostatic capacitance in accordance with the humidity. Also, the voltage VCC is not limited to the illustrated AC voltage, but may be a rectangular DC voltage, by way of example.

Figure 8:
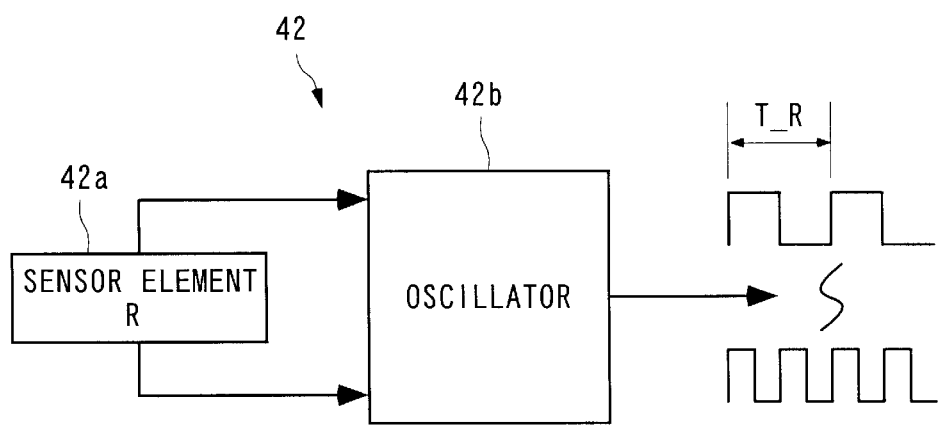
FIG. 8 is a block diagram illustrating the configuration of a humidity sensor used in a third embodiment of the present invention.
Figure 9:
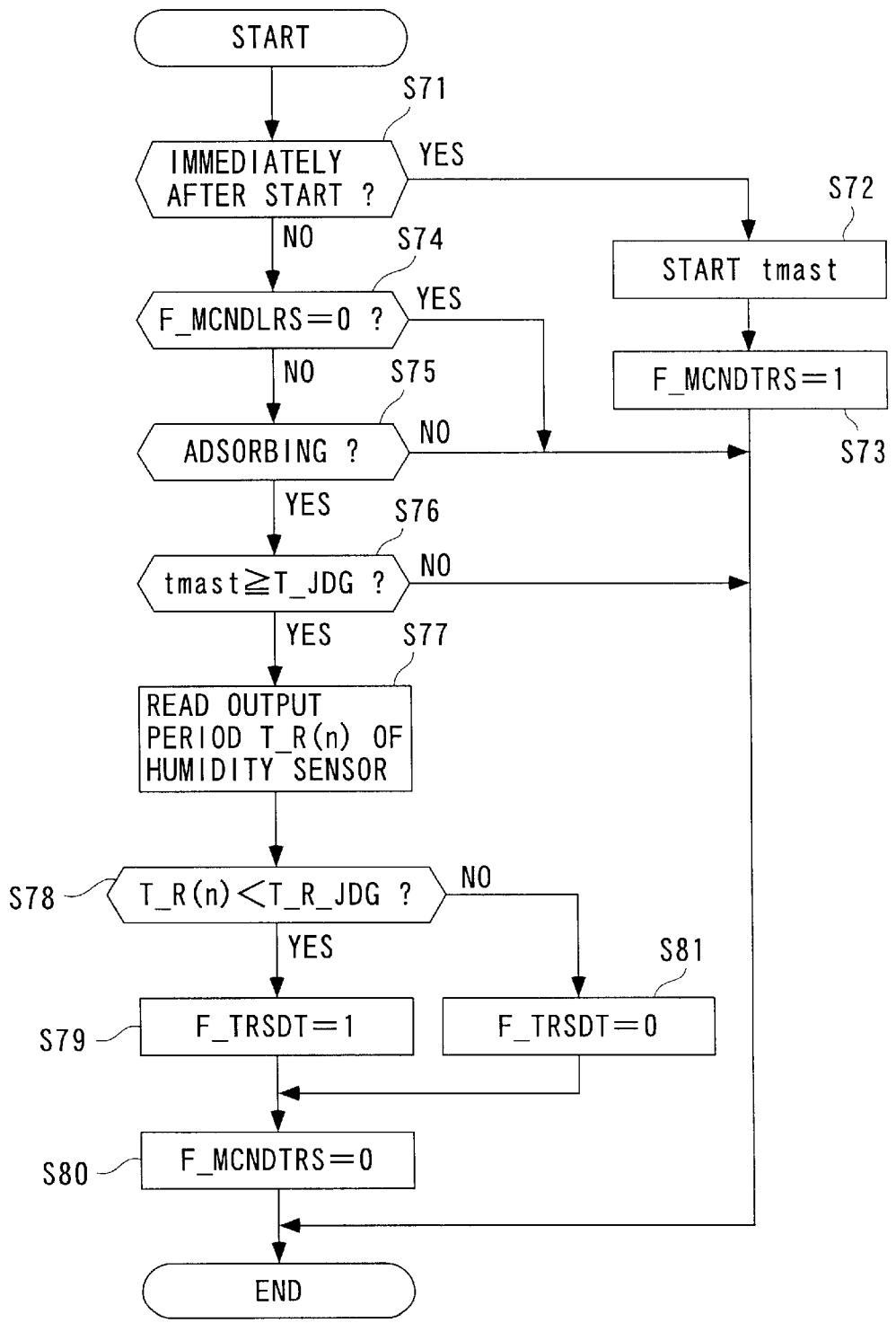
FIG. 9 is a flow chart illustrating a routine for determining a deterioration of the adsorbent according to the third embodiment.
Figure 10:
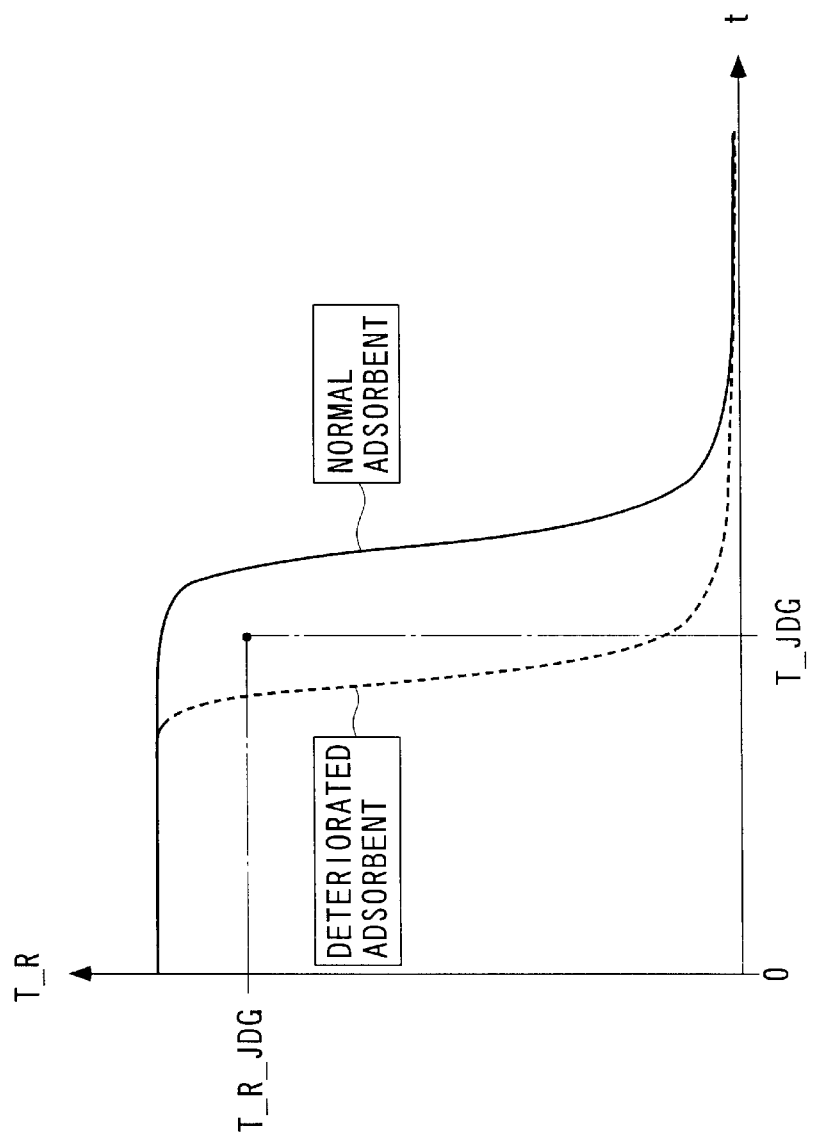
FIG. 10 is a timing chart showing the relationship between a change in an output period of the humidity sensor after the internal combustion engine is started, and the deterioration determination made by the deterioration determination routine in FIG. 8 for a normal adsorbent and a deteriorated adsorbent.

FIGS. 8 through 10 illustrate a third embodiment of the present invention. FIG. 8 illustrates the circuit configuration of a humidity sensor 42 for use in the third embodiment. The humidity sensor 42 has a sensor element 42a configured in a similar manner to the sensor elements 22a, 32a in the first and second embodiments, and an oscillator 42b connected to the sensor element 42a. The oscillator 42b is configured to output an oscillating wave having a frequency reciprocally proportional to the resistance value R (impedance characteristic) of the sensor element 42a, and this oscillating wave is sent to the ECU 25 as a detected output of the humidity sensor 42. Therefore, the period of the oscillating wave (hereinafter referred to as the "output period") T_R presents the same increasing/decreasing tendency as the resistance value R of the sensor element 42a, and more specifically presents a higher value as the humidity of exhaust gases is lower.

FIG. 10 illustrates a routine for determining a deterioration of the adsorbent 16 based on the output period T_R. Specific processing in this routine is also basically identical to the routine for determining a deterioration of the adsorbent 16 in FIG. 3 based on the resistance value R. First, at steps 71–76, completely the same processing is executed as that at steps 31–36 in FIG. 3. If the answer to step 76 is YES, i.e., when the predetermined time T_JDG has elapsed after the start of the engine 1, the CPU reads the output period T_R(n) of the humidity sensor 42 detected at this time (step 77), and determines at step 78 whether or not the read output period T_R(n) is smaller than a predetermined deterioration determining value T_R_JGD (for example, 100 ms) set therefor (see FIG. 11).

Then, similar to steps 39–41 in the routine of FIG. 3, if the answer to step 78 is YES, i.e., if the output period T_R(n) is smaller than the deterioration determining value T_R_JGD (T_R(n)<T_R_JGD) at the time the predetermined time T_JDG has elapsed from the start of the engine 1, the CPU determines that the adsorbent 16 is deteriorated, and sets a deterioration flag F_TRSDT to "1" (step 79). On the other hand, if T_R(n) is equal to or larger than T_R_JGD (T_R(n)≧T_R_JGD), the CPU determines that the adsorbent 16 is not deteriorated, and sets the deterioration flag F_TRSDT to "0" (step 81), and sets the deterioration determination completion flag F_MCNDTRS to "0" (step 80), followed by termination of the routine.

As described above, in the third embodiment, the oscillating wave at a frequency in accordance with the resistance value R (impedance characteristic) of the sensor element 42a is outputted from the oscillator 42b as a detected output of the humidity sensor 42, and the output period T_R of the oscillating wave generated when the predetermined time T_JGD has elapsed from the start of the engine 1 is compared with the deterioration determining value T_R_JDG, thereby making it possible to accurately determine whether the adsorbent 16 is normal or deteriorated in a manner similar to the first and second embodiments. Also, since the output period T_R is used as a detected output of the humidity sensor 42, the deterioration can be more accurately determined for the adsorbent 16 because of the detection accuracy which can be more readily ensured, as compared with, for example, the second embodiment which involves an A/D conversion of the output voltage value V_R.

Likewise, since the sensor element 42a forming part of the humidity sensor 42 in the third embodiment is only required to exhibit an impedance characteristic which varies in accordance with the humidity, the resistance variable element may be replaced by a sensor element which varies the electrostatic capacitance in accordance with the humidity.

Figure 11:
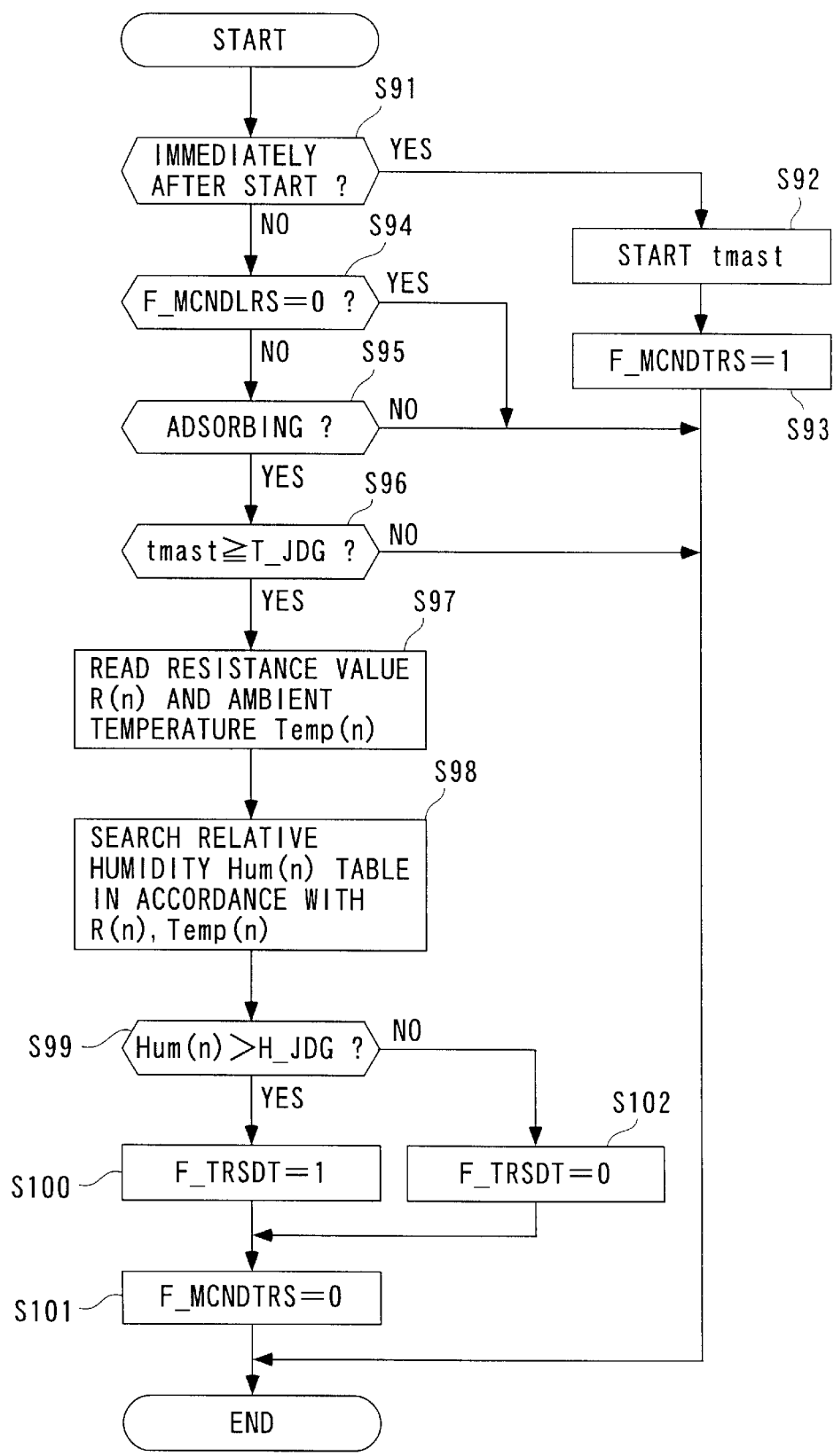
FIG. 11 is a flow chart illustrating a routine for determining a deterioration of the adsorbent according to a fourth embodiment of the present invention.
Figure 12:
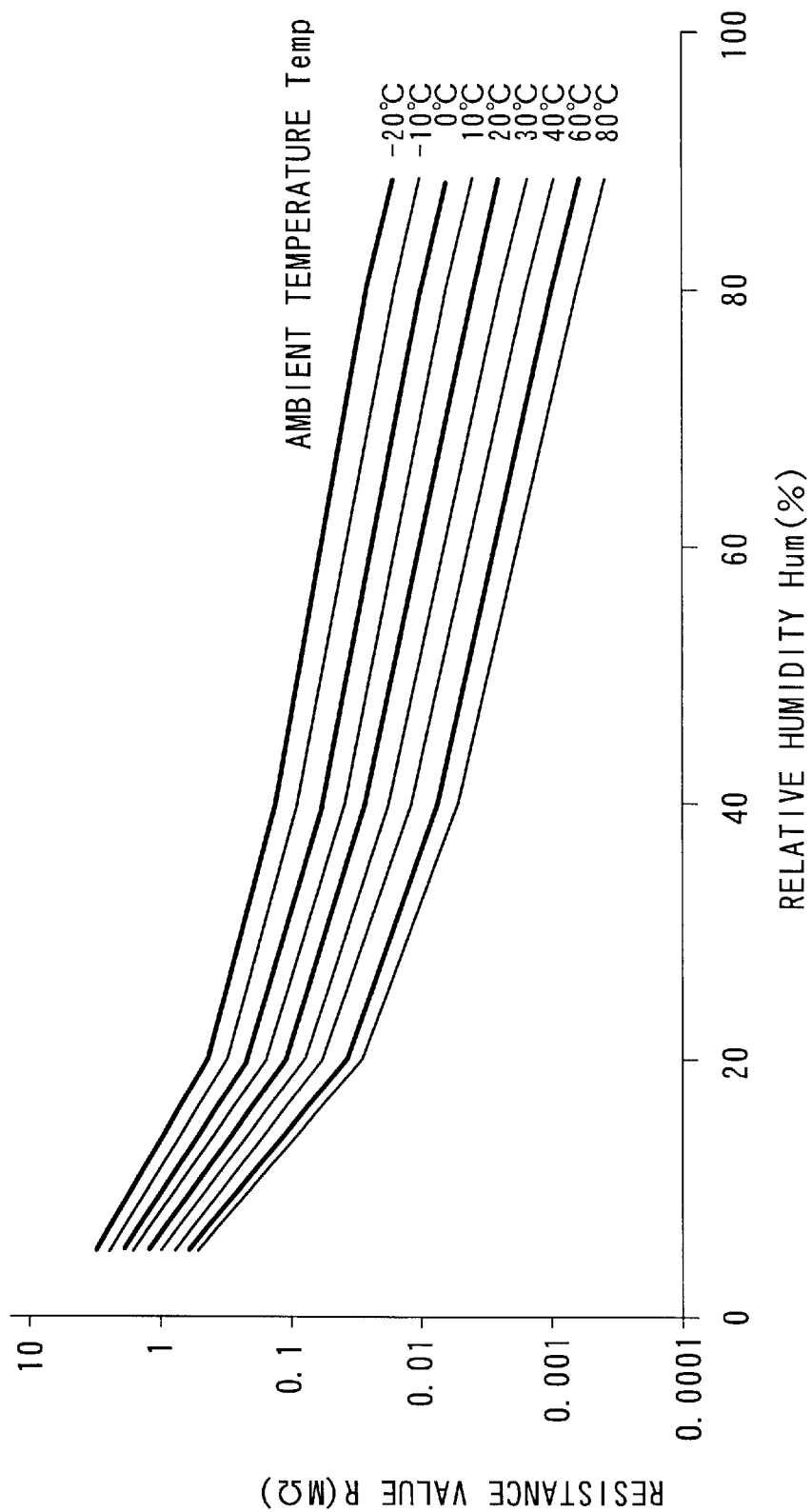
FIG. 12 is shows an exemplary relative humidity table.

FIGS. 11 through 13 illustrate a fourth embodiment of the present invention. The fourth embodiment calculates a relative humidity Hum from the resistance value R of the sensor element 22a detected by the humidity sensor 22 in the first embodiment, and relies on the relative humidity Hum to determine a deterioration of the adsorbent 16.

FIG. 11 shows a routine for determining a deterioration of the adsorbent 16 based on the relative humidity Hum. Likewise, specific processing in this routine is basically identical to the routine for determining a deterioration of the adsorbent 16 in FIG. 3. First, at steps 91–96, completely the same processing is executed as that at steps 31–36 in FIG. 3. If the answer to step 96 is YES, i.e., when the predetermined time T_JDG has elapsed after the start of the engine 1, the CPU reads the resistance value R(n) of the humidity sensor 42, and an ambient temperature Temp(n) detected by the temperature sensor 23 at this time (step 97), and searches a relative humidity Hum table shown in FIG. 12 in accordance with these resistance value R(n) and ambient temperature Temp(n) to calculate the relative humidity Hum (step 98).

As shown in FIG. 12, the relative humidity Hum table is made up of nine tables corresponding to nine stages of ambient temperatures Temp. One table corresponding to the detected ambient temperature Temp(n) is selected from among these tables, and the relative humidity Hum(n) is calculated in accordance with the detected resistance value R(n) based on the selected table. When the ambient temperature Temp(n) is a value between tables, the relative humidity Hum(n) may be calculated by an interpolation. In each table, the relative humidity Hum is set at a smaller value as the resistance value R is larger, and among the tables, the relative humidity Hum is set at a larger value as the ambient temperature Temp is lower. With the foregoing settings, the relative humidity Hum compensated for the temperature can be appropriately calculated in accordance with the resistance value R and ambient temperature Temp of the humidity sensor 22. The relative humidity Hum exhibits an increasing/decreasing tendency to a change in humidity completely reverse to the resistance value R, output voltage V_R and output period T_R which have been used respectively in the foregoing embodiments as parameters indicative of the humidity (see FIG. 13).

At step 99 next to step 98, it is determined whether or not the calculated relative humidity Hum(n) is larger than a predetermined deterioration determining value H_JGD (for example, 25%) set therefor (see FIG. 13). Specific processing subsequent to step 99 is identical to that at steps 39–41 in FIG. 3. If the answer to step 99 is YES, i.e., when the relative humidity Hum(n) is larger than the deterioration determining value H_JGD (Hum(n)>H_JGD) at the time the predetermined time T_JDG has elapsed from the start of the engine 1, the CPU determines that the adsorbent 16 is deteriorated, and sets the deterioration flag F_TRSDT to "1" (step 100). On the other hand, if Hum(n) is equal to or smaller than H_JGD (Hum(n)≦H_JGD), the CPU determines that the adsorbent 16 is not deteriorated, and sets the deterioration flag F_TRSDT to "0" (step 102), and then sets the deterioration determination completion flag F_MCNDTRS to "0" (step 101), followed by termination of the routine.

As described above, in the fourth embodiment, the relative humidity Hum compensated for the temperature can be appropriately found based on the resistance value R of the sensor element 22a, and the ambient temperature Temp detected by the temperature sensor 23. Also, it can be accurately determined whether the adsorbent 16 is normal or deteriorated by comparing the relative humidity Hum found in the foregoing manner with the deterioration determination value H_JDG in a manner similar to the first through third embodiments. While in the fourth embodiment, the relative humidity Hum is retrieved from the table of FIG. 12, the present invention is not limited to this specific way of finding the relative humidity Hum. Alternatively, the relative humidity Hum may be calculated using an approximate equation, by way of example, or may be corrected based on the atmospheric pressure.

As will be appreciated from the foregoing, according to the embodiments so far described, determination is made as to whether or not the adsorbent 16 is deteriorated by comparing a humidity parameter detected by the humidity sensor 22, 32 or 42 (resistance value R, output voltage V_R, output period T_R or relative humidity Hum) at the time the predetermined time T_JDG has elapsed from the start of the engine 1 with the deterioration determination value associated therewith (R_JDG, V_R_JDG, T_R_JDG or H_JDG), so that the determination can be accurately made for a deterioration of the adsorbent 16, while well reflecting an adsorbing state in the adsorbent 16. Also, except for the fourth embodiment, only one humidity sensor, which is generally less expensive than a temperature sensor, need be arranged at a location downstream of the adsorbent 16, so that the resulting determining apparatus can be made in a relatively simple configuration at a low cost.

It should be understood that the present invention is not limited to the embodiments described above but may be practiced in a variety of manners. For example, the humidity sensor is arbitrary as long as it can detect the humidity of exhaust gases, for example, such one that detects the absolute humidity. Also, while the fourth embodiment detects the ambient temperature around the humidity sensor using a temperature sensor, the ambient temperature may be estimated, for example, in accordance with an operating condition of the engine 1. Otherwise, details in configuration may be modified as appropriate without departing from the scope and spirit of the invention as defined in the appended claims.

As described above in detail, the adsorbent deterioration determining apparatus according to the present invention can advantageously determine a deterioration of an adsorbent in a relatively simple configuration in a high accuracy.

What is claimed is:

1. An adsorbent deterioration determining apparatus for determining deterioration of an adsorbent arranged in an exhaust system of an internal combustion engine for purifying exhaust gas, said adsorbent capable of adsorbing hydrocarbons and moisture in exhaust gases, said apparatus comprising:

a humidity sensor arranged at a location downstream of said adsorbent in said exhaust system for detecting humidity of exhaust gases; and a deterioration determining means for determining deterioration of said adsorbent in accordance with a detected output of said humidity sensor at the time a predetermined time has elapsed from a start of said internal combustion engine.

2. An adsorbent deterioration determining apparatus according to claim 1, wherein said humidity sensor includes a sensor element which has an impedance characteristic that varies in accordance with the humidity, and outputs as said detected output a voltage in accordance with a change in the impedance characteristic when said sensor element is applied with a supply voltage.

3. An adsorbent deterioration determining apparatus for determining deterioration of an adsorbent arranged in an exhaust system of an internal combustion engine for purifying exhaust gas, said adsorbent capable of adsorbing hydrocarbons and moisture in exhaust gases, said apparatus comprising:

a humidity sensor arranged at a location downstream of said adsorbent in said exhaust system for detecting humidity of exhaust gases;

a deterioration determining means for determining deterioration of said adsorbent in accordance with a detected output of said humidity sensor at the time a predetermined time has elapsed from a start of said internal combustion engine;

a sensor element which has an impedance characteristic that varies in accordance with the humidity; and an oscillator for generating an oscillating wave at a frequency defined in accordance with the impedance characteristic of said sensor element, wherein said humidity sensor outputs as said detected output said oscillating wave from said oscillator.

4. An adsorbent deterioration determining apparatus for determining deterioration of an adsorbent arranged in an exhaust system of an internal combustion engine for purifying exhaust gas, said adsorbent capable of adsorbing hydrocarbons and moisture in exhaust gases, said apparatus comprising:

a humidity sensor arranged at a location downstream of said adsorbent in said exhaust system for detecting humidity of exhaust gases;

a deterioration determining means for determining deterioration of said adsorbent in accordance with a detected output of said humidity sensor at the time a predetermined time has elapsed from a start of said internal combustion engine;

a temperature detecting means for detecting temperature around said humidity sensor; and a relative humidity calculating means for calculating relative humidity of exhaust gases based on the detected output of said humidity sensor, and the temperature detected by said temperature detecting means, wherein said deterioration determining means determines deterioration of said adsorbent in accordance with said calculated relative humidity.

* * * * *